UNITED STATES PATENT OFFICE.

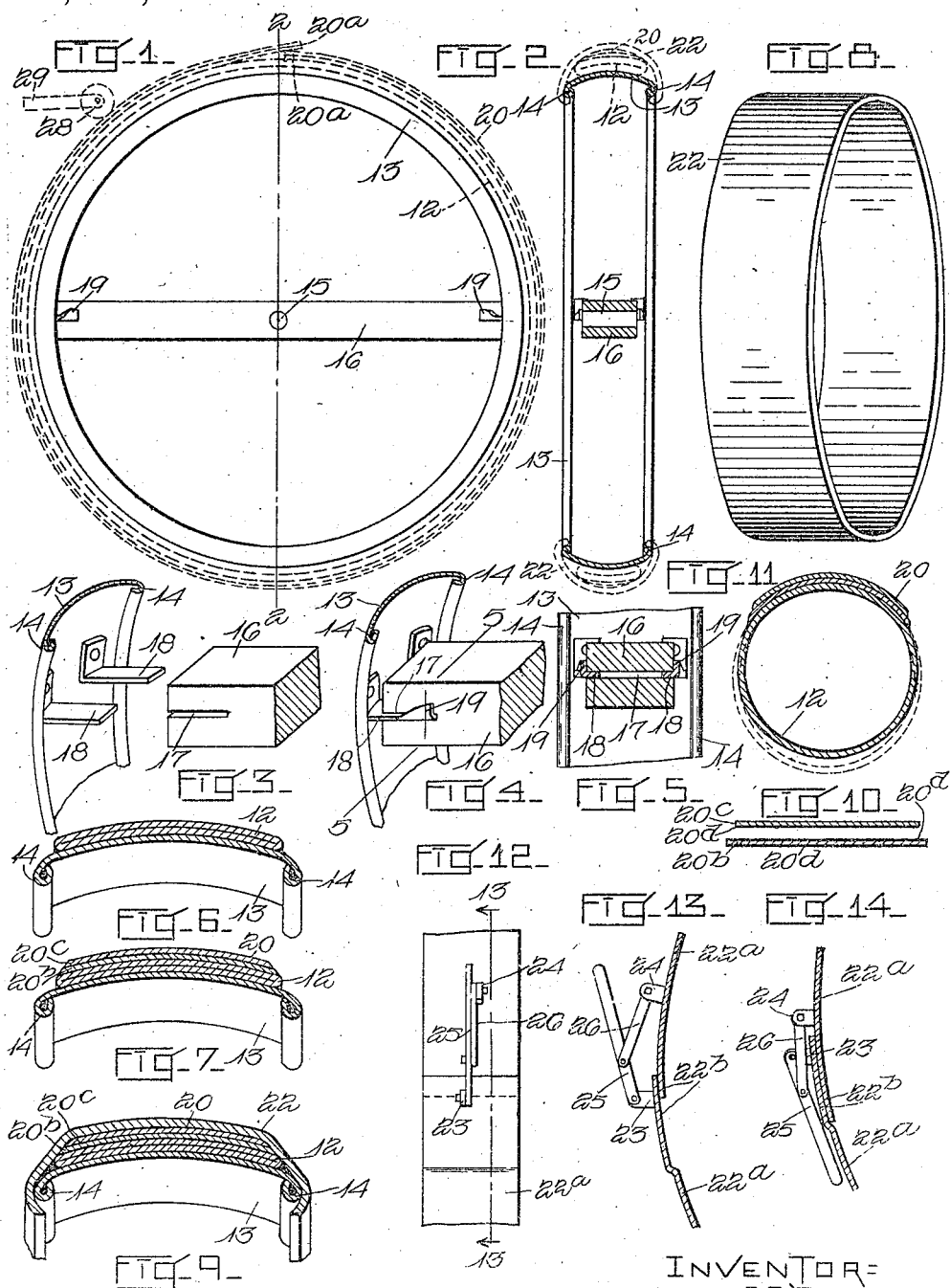

JOHN H. POOLE, OF BROCKTON, MASSACHUSETTS, ASSIGNOR TO REINFORCED INNER TUBE COMPANY, OF BROCKTON, MASSACHUSETTS, A CORPORATION OF MASSACHUSETTS.

METHOD OF AND APPARATUS FOR REINFORCING INFLATABLE TIRE-TUBES.

1,179,033.  Specification of Letters Patent.  Patented Apr. 11, 1916.

Application filed July 17, 1915.  Serial No. 40,417.

*To all whom it may concern:*

Be it known that I, JOHN H. POOLE, a citizen of the United States, and resident of Brockton, in the county of Plymouth and State of Massachusetts, have invented certain new and useful Improvements in Methods of and Apparatus for Reinforcing Inflatable Tire-Tubes, of which the following is a specification.

This invention relates to an inflatable annular inner tube for a pneumatic tire, the tube being provided with an external reinforcing member or band secured to the outer portion of the tube or that portion which bears on the tread portion of a tire shoe in which the tube is inclosed, as shown by Letters Patent of the United States No. 1,144,239, granted June 22, 1915. The reinforcing band includes one or more layers of practically inextensible textile fabric and is caused to adhere firmly to the outer portion of the tube, so that said outer portion is prevented by the band from stretching. In the event of a puncture in the outer portion of the tube, the band, although punctured with the tube, prevents the stretching of the punctured portion of the tube, so that the fracture cannot be enlarged and opened by the air pressure within the tube, the tendency of the air pressure being rather to close the fracture by pressing its walls together and thus prevent or minimize the leakage of air.

The present invention has for its object to enable the reinforcing band to be attached to the outer portion of the tube while said portion is free from tension, so that when the tube is inflated and in use the outer portion of the tube will retain the full original thickness of the rubber of which the tube is made and will be freely compressible by air pressure within the tube to close punctures formed in said outer portion.

The invention consists in the improved method of applying and securing the reinforcing band, and in the improved apparatus whereby said method may be practised, all as hereinafter described and claimed.

Of the accompanying drawings forming a part of this specification: Figure 1 represents a side view of a form constituting a part of the improved apparatus, a flattened inner tube and a reinforcing band being shown by dotted lines on said form; Fig. 2 represents a section on line 2—2 of Fig. 1, showing by dotted lines not only the flattened tube and reinforcing band, but also the elastic ligature hereinafter refererd to; Figs. 3 and 4 represent fragmentary perspective views illustrating details of the form shown by Figs. 1 and 2; Fig. 5 represents a section on line 5—5 of Fig. 4; Fig. 6 represents an enlargement of a portion of Fig. 2, showing the flattened tube on the form; Fig. 7 represents a view similar to Fig. 6, showing the reinforcing band applied to the flattened tube; Fig. 8 represents a perspective view of an elastic ligature constituting a part of the apparatus; Fig. 9 represents a view similar to Fig. 7, showing the ligature applied to the form and exerting radial inward pressure on the reinforcing band and flattened tube; Fig. 10 represents in section two laminated layers of which the reinforcing band may be made; Fig. 11 represents a sectional view of the reinforced tube, the normal diameter of the tube being indicated by full lines, and its increased diameter by inflation being indicated by dotted lines; Fig. 12 represents a fragmentary side view of a modified form of ligature; Fig. 13 represents a section on line 13—13 of Fig. 12, Figs. 12 and 13 showing the ligature expanded; Fig. 14 represents a view similar to Fig. 13, showing the ligature contracted.

The same reference characters indicate the same or similar parts in all the views.

In carrying out my invention I take an ordinary annular inner tube 12 of the kind used in the shoes of pneumatic tires, said tube being deflated, and place it, in the collapsed flattened condition shown by Figs. 2 and 6, on a circular form 13. I have found that when an inner tube 12 is deflated and its inner and outer portions meet and form two contacting layers or sides, both sides assume a transversely crowning form when the inner side is supported by a circular bed conforming to its outward bulge, the inner layer bulging outwardly without wrinkles and the outer layer lying smoothly without wrinkles on the inner layer, as shown by Fig. 6. By an outward bulge I mean the reversal of the bulge or curvature of the inner side of an inflated tube. I have utilized this discovery by making the form 13 transversely crowning or convex, and of such diameter that it conforms accurately to the inner side of the tube, and supports the two sides smoothly without stretching the same appreciably.

Preferably the form 13 is a band of sheet metal, the edges of which are rolled inwardly at 14 for stiffness. The form is adapted to be supported by and rotate loosely on a fixed rod or spindle (not shown), and is provided with a hub containing a socket or bearing 15 adapted to receive said spindle, said hub as here shown being the central portion of a wooden crossbar 16, the ends of which have slots 17 receiving sheet metal tongues 18 riveted to and projecting inwardly from the form. Said tongues are bent at their outer corners to form ears 19 bearing on opposite sides of the bar 16, as shown by Fig. 5. The bar is thus detachably secured to the form, the bar being removable when the ears 19 are bent to restore the tongues 18 to the form shown by Fig. 3.

20 represents the reinforcing band, which is formed by wrapping a strip of flexible material around the outer surface of the tube 12, the ends 20ᵃ of the strip being overlapped, as shown by dotted lines in Fig. 1. The strip preferably includes two or more layers of practically inextensible textile fabric, such as cotton duck or canvas, of suitable thickness, its width being somewhat less than half the circumference of the tube. Fig. 10 shows two canvas layers 20ᵇ and 20ᶜ, with which are associated layers 20ᵈ of unvulcanized rubber which unite the canvas layers to form the strip and enable the strip as a whole to be united to the tube. Said rubber layers may be composed of relatively pure rubber, known as vulcanizing gum, which is applied in thin sheets to the canvas layers after being rendered adhesive by applying a suitable solvent of rubber, such as gasolene, to its surfaces. The inner canvas layer 20ᵇ is preferably coated on both sides with the vulcanizing gum, and the outer canvas layer is coated on its inner side only, its outer side, which in use contacts with the tire shoe, being exposed, and constituting what is known as a "bareback." The coated layers shown by Fig. 10 are united to form a laminated strip before the strip is formed into a band, and preparation is made for causing the adhesion of the band to the tube before the formation and application of the band. I have successfully prepared for said adhesion in two different ways or by two different modes of treatment, one of which I call the cold vulcanizing process, which is practised by treating the rubber coated inner surface of the reinforcing strip and the corresponding rubber surface of the tube with an acid which softens said surfaces and renders them adhesive for a brief period, and immediately pressing said surfaces together before they can lose the adhesive character thus imparted. This process does not necessarily require the use of vulcanizing gum on the inner surface of the reinforcing strip, and any other kind of unvulcanized rubber capable of being softened by the acid may be used for this surface. The other mode of treatment requires the employment of vulcanizing gum, and includes the partial dissolution of the contacting surfaces of the reinforcing strip and the tube by a solvent, such as gasolene.

After either of the above described preparations, I wrap the reinforcing strip around the circumference of the tube, as indicated by Fig. 1, and apply radial inward pressure to all parts of the band to insure intimate contact between all parts of its adhesive inner surface and the surface of the tube covered by the band. Said pressure is preferably exerted simultaneously on all parts of the band, and maintained for a somewhat protracted period by a contractile ligature forming a part of the apparatus. When the above described cold vulcanizing process is practised a quick application of radial inward pressure simultaneously to all parts of the reinforcing band is important, because of the evanescent effect of the acid employed.

The ligature 22 is preferably an endless band of elastic rubber, the width of which is greater than that of the reinforcing band 20, as shown by Fig. 9, while its normal diameter is less than that of the form 13, as may be seen by comparing Figs. 2 and 8.

The ligature 22 is caused to embrace the form and the tube and band supported thereby, the ligature being thus expanded so that by its effort to contract, it quickly and automatically applies radial inward pressure simultaneously to all parts of the reinforcing band, and maintains said pressure as long as may be desired.

Figs. 12, 13 and 14 show a ligature composed of a thin flexible strip 22ᵃ, which may be of sheet metal, the ends 22ᵇ of which are in sliding contact with each other, one of said ends being offset and overlapping the other. The ligature 22ᵃ is provided with means whereby it may be manually contracted to apply radial inward pressure to the reinforcing band, said means as here shown including ears 23 and 24 attached to opposite end portions of the ligature, a lever 25 pivoted to the ear 23, and a link 26 pivoted at one end to the lever 25 and at the opposite end to the ear 24. When the lever is swung from the position shown by Figs. 12 and 13, to that shown by Fig. 14, the ligature 22ᵃ is contracted and held in a contracted condition.

When preparation is made for adhesion by a solvent acting on an inner layer 20ᵈ of vulcanizing gum, the element of time is less important, so that while a contractile ligature constitutes a desirable and successful means for applying the radial inward pressure, other means such as a roller 28, shown by dotted lines in Fig. 1, may be employed for the same purpose. Said roller applies the radial inward pressure progressively and may be journaled in a frame provided with a handle 29, the roller being applied by hand.

After the reinforcing band and the tube are suitably united the reinforced tube is removed from the form, and is ready for inflation and use. Fig. 11 shows by full lines the tube expanded to its normal diameter, the dotted lines indicating the portion of the tube that is expanded by inflation.

It will now be seen that by the described method and means I insure the retention by the outer portion of the tube of its original thickness and its maximum compressibility, so that the air pressure in the tube is enabled to act effectively in pressing together the walls of a puncture in the outer portion of the tube.

When the reinforcing band is united to the tube by vulcanizing gum, preliminarily softened by a solvent as described, the gum acts at once to cause a firm adhesion of the band to the tube without being vulvanized, and is subsequently vulcanized or semi-vulcanized by the heat developed when the tire of which the tube forms a part is in operation. The vulcanizing gum uniting the layers of the reinforcing band is similarly affected.

I claim:

1. The improved method of reinforcing an inflatable, annular tube, which consists in placing the tube in a collapsed, flattened condition on an unyielding, endless, circular form closely fitting the inner surface of the collapsed tube, applying a flexible, non-extensible, reinforcing strip to the outer surface of the collapsed tube to form a band surrounding the tube, rendering one or both of the contacting surfaces of the tube and strip adhesive before applying the strip, and applying radial, inward pressure to all parts of the band during the continuance of the adhesive condition of said surface or surfaces to cause the band to adhere to the collapsed tube.

2. The improved method of reinforcing an inflatable, annular tube, which consists in placing the tube in a collapsed, flattened condition on an unyielding, endless, circular for closely fitting the inner surface of the collapsed tube, applying a flexible, non-extensible, reinforcing strip to the outer surface of the collapsed tube to form a band surrounding the tube, said strip including an outer layer of woven fabric and an inner layer of vulcanizing gum, rendering said inner layer adhesive by a solvent of the gum before applying the strip, and applying radial, inward pressure to all parts of the band while said inner layer is in an adhesive condition.

3. Apparatus for reinforcing an inflatable, annular tube, comprising a circular form having a transversely crowning periphery and an external diameter conforming to the inner side of the tube when the latter is collapsed and flattened, said form being adapted to support the tube with the inner side bulging outwardly and its outer side lying smoothly on its inner side, and means for exerting radial inward pressure on all parts of a reinforcing band applied to the convex outer side of a collapsed and flattened tube supported by said form.

4. Apparatus for reinforcing an inflatable, annular tube, comprising a circular form having an external diameter conforming to the internal diameter of the tube when the latter is collapsed and flattened, and a ligature adapted to simultaneously exert radial, inward pressure on all parts of a reinforcing band applied to a collapsed and flattened tube supported by said form.

5. Apparatus for reinforcing an inflatable, annular tube, comprising a circular form having an external diameter conforming to the internal diameter of the tube when the latter is collapsed and flattened, and an elastic ligature normally of smaller diameter than the form, and adapted to be expanded to embrace a reinforcing band and a tube on said form, and simultaneously exert radial, inward pressure on all parts of said reinforcing band.

In testimony whereof I have affixed my signature.

JOHN H. POOLE.